March 21, 1939.  R. K. PRINCE  2,151,355
ELECTROMAGNETIC MOTOR
Filed Nov. 13, 1935  3 Sheets-Sheet 1
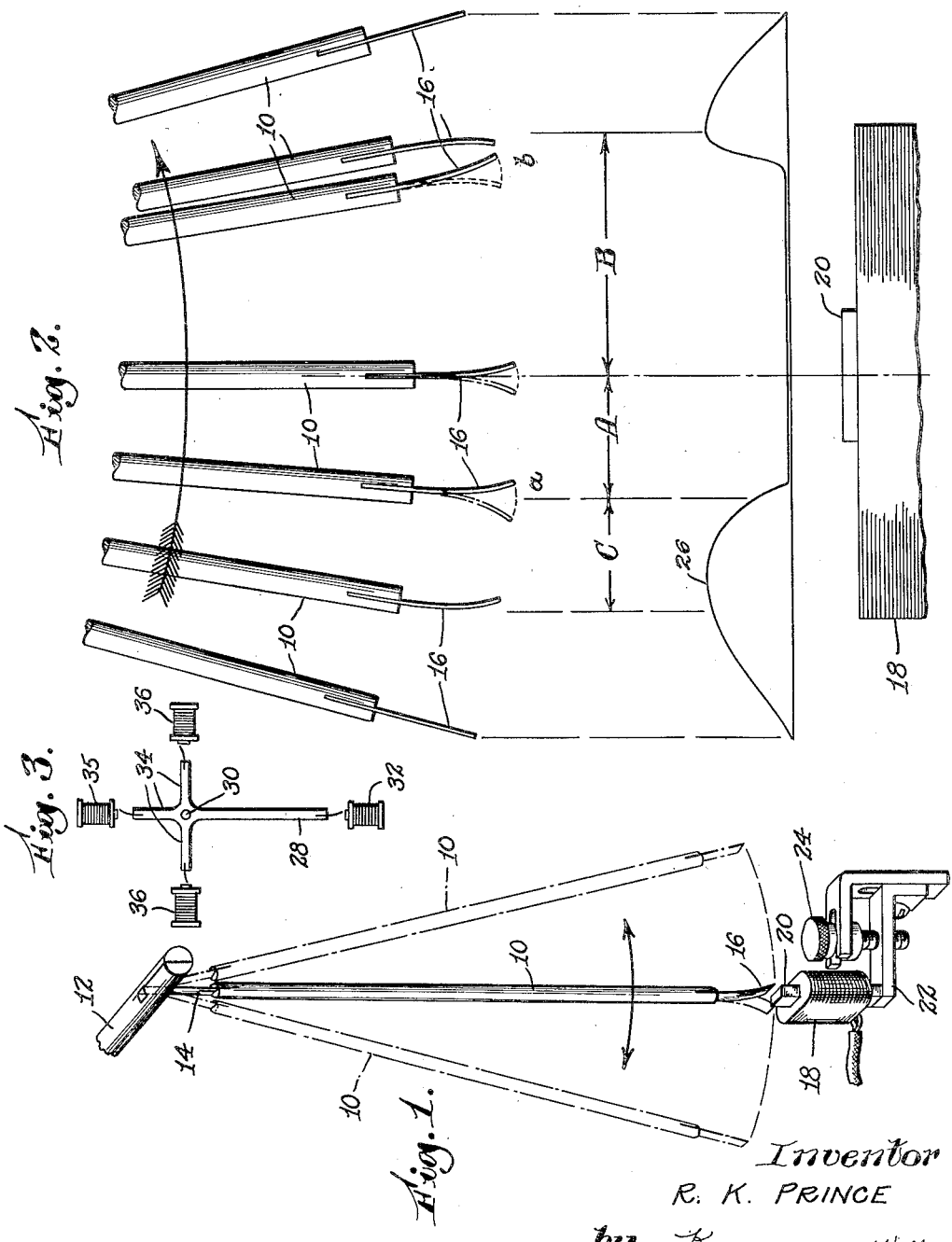
Inventor
R. K. PRINCE
by Kenway & Witter
Attorneys

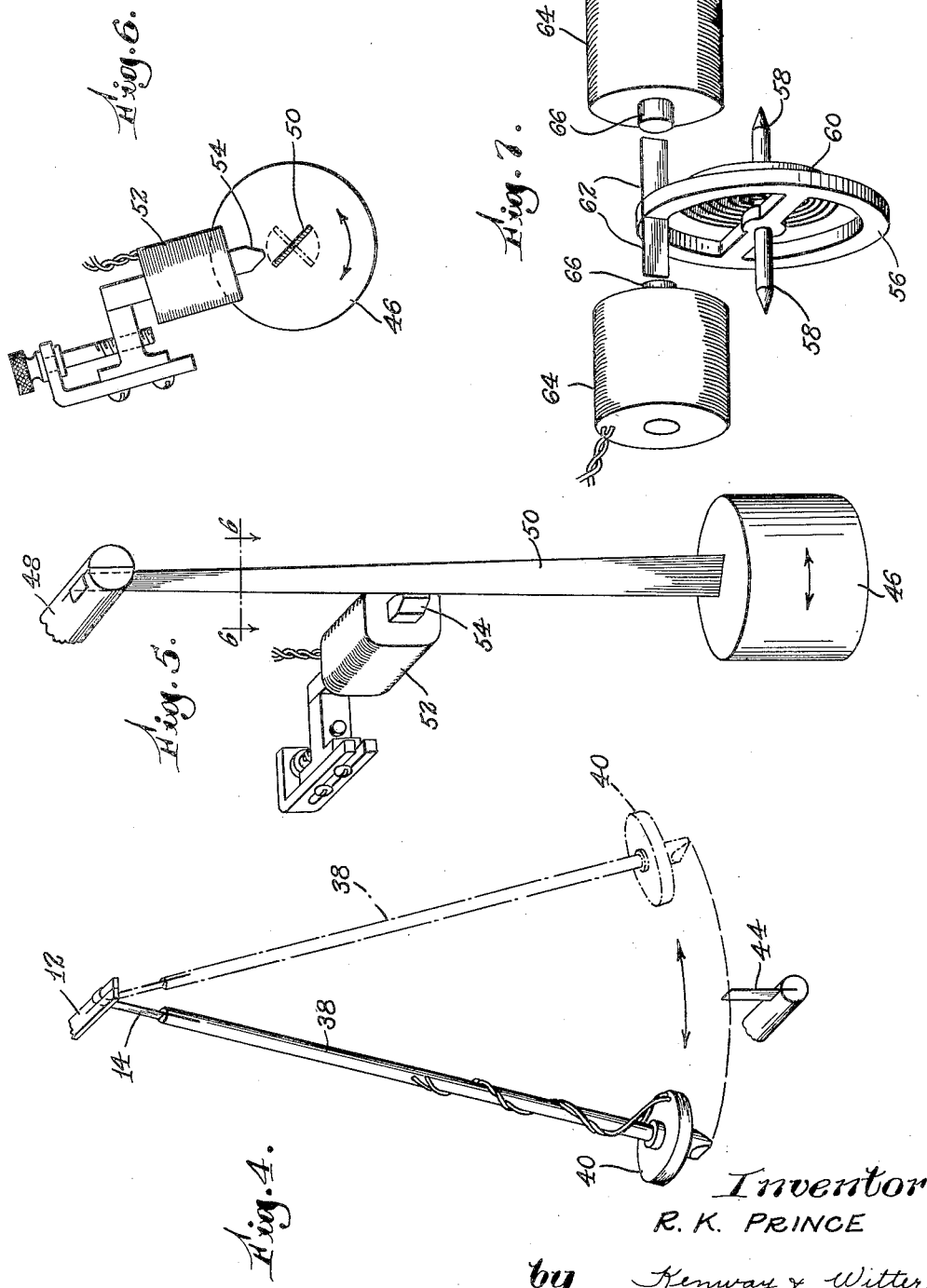

March 21, 1939. R. K. PRINCE 2,151,355
ELECTROMAGNETIC MOTOR
Filed Nov. 13, 1935 3 Sheets-Sheet 3
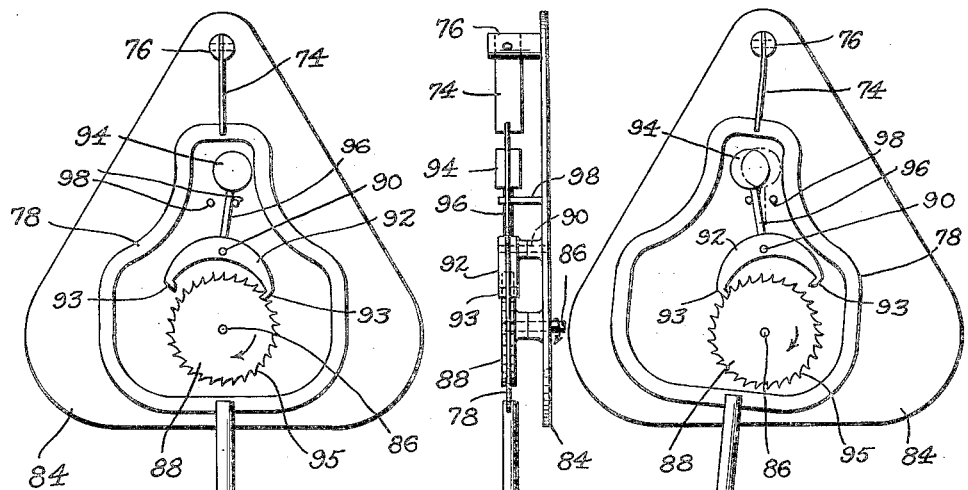
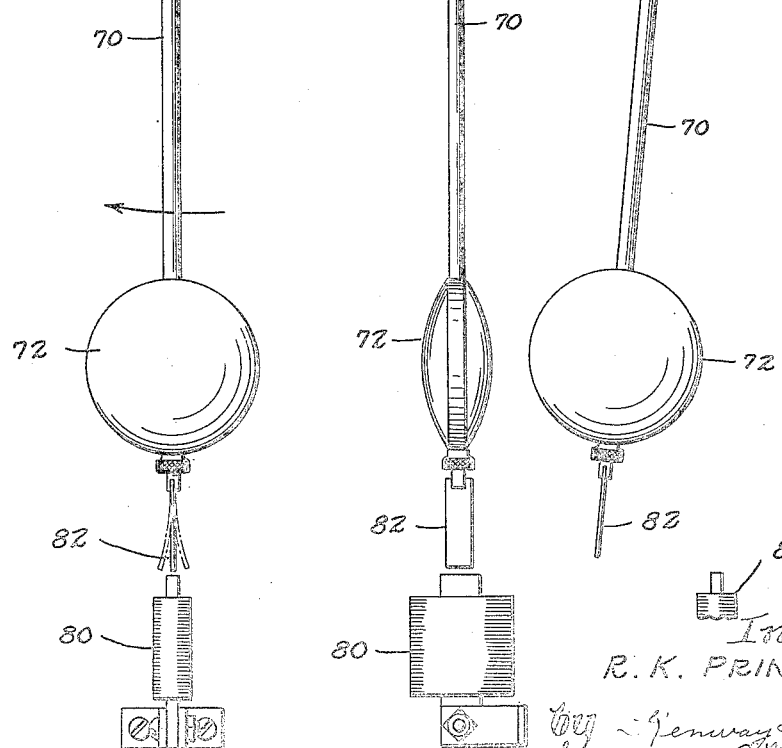
Inventor
R. K. PRINCE
By Kenway & Witter
Attorneys Patented Mar. 21, 1939

2,151,355

UNITED STATES PATENT OFFICE 2,151,355

ELECTROMAGNETIC MOTOR

Robert K. Prince, Westfield, Mass., assignor of one-half to Ralph E. Thompson, Boston, Mass.

Application November 13, 1935, Serial No. 49,534

18 Claims. (Cl. 172—126)

This invention relates to electro-magnetic motors of a new type employing as a power source the action of a magnetic field of periodically varying flux density upon a vibratory magnetic means associated with or carried by a member whose actuation causes the vibratory means to pass in opposite directions through the field in an oscillatory manner, it being understood, as hereinafter described, that either the vibratory means or the field producing means may be carried by the actuated member. The magnetic field is conveniently produced by an alternating current of 110 volts, 60 cycles, such as is commonly provided at the present time for public consumption, and alternations of which are commonly controlled by astronomical clocks or their equivalent. The vibratory means consists in whole or in part of magnetic material and its relation to the actuated member and field is such that, upon actuation of the member, the vibratory means periodically passes in opposite directions through the field. During each such passage the vibratory means is vibrated by the field, and the reaction thereof on the actuated member is such as to both start and continue the actuation of the member.

The invention is adapted to various uses, such as novelties and advertising devices requiring a power output sufficient only to provide and continue periodic motion of a member to be actuated, and is more particularly adapted to use in connection with timing or timekeeping mechanisms employing an oscillatory member or pendulum wherein the oscillation thereof is continued by imparting thereto small impulses each time the member passes through its zero position, the pendulum or equivalent member being allowed to move freely during the rest of its movement. I am aware that it has been heretofore proposed to operate a pendulum by imparting electro-magnetic impulses thereto, but such prior proposals employ the use of make and break elements for interrupting the circuit and/or other additional equipment or parts, and the use of such elements or parts has been found objectionable because of sticking, burring and other difficulties arising therefrom. This objection is so great as to render such mechanisms undesirable and unprofitable, especially for time keeping purposes. It is pointed out that my invention employs no such elements or parts, nor any equivalent thereof, and it is therefore adapted to operate continuously and uninterruptedly over long periods of time.

The response of the vibratory member in an alternating current field of the nature above described is not critical as far as power is concerned, and I find that when the vibratory member, as for example, a reed, possesses the ability to vibrate in a 60 cycle field, for example, and if this reed is attached to a simple or compound pendulum, energy is imparted to the pendulum and one of two conditions prevails as follows:

(1) In the event that a normal period of vibration of the pendulum is not a sub-harmonic of the 60 cycle current, energy will be imparted to the pendulum and, if the actuated member be sufficiently massive, the pendulum will swing in its natural period or in a period approximating that of its natural period.

(2) If, on the other hand, the normal period of the pendulum, bob and the reed is such that it is approximately a sub-harmonic of a 60 cycle alternating current, or its equivalent, I find that the imparted energy, due to the varying flux of the alternating current field or a pulsating direct current field, is sufficient to cause: (a) a continuous or periodic motion in the pendulum which will be synchronous and sub-harmonic with the pulsations of the field, or (b) the imparted energy will be sufficient to effect a positive input to the pendulum system to the end that timekeeping qualities are imparted it while or in part because of the frequency of variation in magnetic flux.

Another feature of importance is the fact that temporary interruptions of the current which commonly permit synchronous motors of a common type, used for timekeeping purposes, to stop, will have little or no effect on my improved motor of the pendulum type. During such interruptions, the periodic motion of the pendulum may continue in its natural period for periods of several minutes and, upon return of the current, the power thereof will immediately again tie in with the swinging of the pendulum to keep it in motion at the proper amplitude and period.

While I have referred more particularly to pendulums of the swinging type, it will be understood that my invention is not to be considered as thus limited, since, as hereinafter described, the invention is also applicable not only to pendulums of the torsion type, but furthermore, to other actuated members mounted to move periodically in an oscillatory manner. Examples of such further constructions are hereinafter more specifically described, the object of the invention being the production of a new and improved motor of the nature herein generally and specifically defined.

Various applications of my invention may require various forms of movement and a further feature of the invention relates more particularly to a pendulum of the type which oscillates within a single plane and to means for obtaining rotary movement from such oscillating movement. Furthermore, as will hereinafter appear, this feature of the invention not only serves the purpose of providing a rotary motion, but also serves the purpose of regulating the oscillations of the pendulum to a degree of uniformity not otherwise obtainable.

These and other features of the invention will be best understood and appreciated from the following description of certain embodiments thereof selected for purposes of illustration and shown in the accompanying drawings in which:

Fig. 1 is a perspective view of my novel motor embodied in the form of a simple swinging pendulum.

Fig. 2 is a diagrammatic view illustrating the action of the pendulum.

Fig. 3 illustrates a modification of the pendulum shown in Fig. 1.

Fig. 4 is a perspective view of a further modified form of the invention.

Fig. 5 is a perspective view of the invention embodied in a pendulum of the torsion type.

Fig. 6 is a plan sectional view taken on line 6—6 of Fig. 5 and

Fig. 7 is a perspective view of a form of the invention utilizing a balance wheel as the actuated member.

Fig. 8 is a front elevation of a further feature of the invention.

Fig. 9 is a side elevation thereof.

Fig. 10 is a front elevation showing the device in operation.

My invention may be embodied in motors of various forms certain of which are illustrated in the accompanying drawings. One of the most practical forms for utility purposes would appear to be a motor of the pendulum type and, furthermore, while the invention and particularly the pendulum embodiment thereof is adaptable to various uses, it is believed to be especially adaptable to use in timing or timekeeping mechanisms. The many and various attempts heretofore made to develop a successful electrically operating motor of the oscillating or pendulum type for time keeping purposes have commonly required an intermittent flow of current determined in its cycle by the periodic motion of the pendulum and have employed make and break mechanisms under the control of the pendulum for this purpose. It will be appreciated that such make and break mechanisms not only complicate the motor and its operation, but also that the additional actuating burden placed on the pendulum may seriously affect its operation. Furthermore, and even more objectionable, is the unreliability of such make and break mechanisms and its net mechanical change over a period of time. A clock is necessarily a delicate instrument and even a slight defect or the possibility of frequent disorders renders it practically useless. My invention herein eliminates all such delicate and unreliable mechanisms and provides a simple electrically-operated pendulum which is given a slight propelling impulse each time it passes through its position of rest.

If a magnetic vibratory member is placed in an electro-magnetic field of varying flux density, the member will vibrate with the flux variations, and I have discovered that when such member, or the means producing such field, is carried by a member to be actuated, such as a pendulum, the reaction between the vibratory member and the field keeps the actuated member in constant motion. I have furthermore discovered that when such a pendulum is so mounted that the vibratory member is normally in said field, when the pendulum is at rest, the reactions between the vibratory member and the field will start the pendulum swinging and keep it swinging at its periodic rate. In the accompanying drawings I have illustrated certain embodiments of my invention in connection with such a pendulum.

In Figs. 1 and 3 is shown a preferred form of the invention embodying a simple swinging pendulum. This pendulum comprises a rod 10 hung from a support 12, as by means of a reed 14. A vibratory member in the form of a flat reed 16 of magnetic material is carried by and projects beyond the free end of the pendulum. Beneath the pendulum and reed 16, and substantially at the position of rest thereof, is mounted a solenoid 18 capable of producing a magnetic field, the core 20 of the solenoid being in proximity to and substantially in alignment with the zero or rest position of the reed 16. The solenoid is illustrated as mounted on a bracket 22 adjustable toward and from the reed 16 under the action of a screw 24.

It is desirable that the pendulum motor should operate on alternating electric current such as is commonly provided in homes and, when the solenoid 18 is energized with such a current, the pulsations in the magnetic field produced cause the reed 16 to vibrate when the reed is located substantially in the field, as illustrated in Figs. 1 and 2. When this vibration is of sufficient amplitude the reaction thereof against the pendulum causes the pendulum to vibrate or swing and eventually to be brought up to its full periodic motion. The amplitude of reed vibration increases as the reed and solenoid are brought closer together and the solenoid may be brought to its proper relative position by the means of the screw 24. After the pendulum is in motion it is kept oscillating by a slight impulse given thereto each time it passes through and beyond its zero position. While the reason for this action and reaction is believed to be as hereinafter pointed out, it will be understood that the phenomenon is new and applicant is herein giving only the best explanation he has so far discovered.

This explanation for the impulse given to the pendulum each time it passes the zero position is illustrated diagrammatically in Fig. 2. It will be noted that the reed 16 vibrates during its passage through the field, but reed vibration may not be apparent at the ends of the pendulum movement. As the pendulum swings from left to right (Fig. 2) the magnetic attraction, acting on and bending the reed forwardly and drawing the pendulum forwardly, increases as the reed approaches its zero position, as indicated by the graph 26. When the reed reaches the position a it begins to vibrate to such an extent as to neutralize or lose the attractive forces theretofore acting thereon and drawing the pendulum forwardly. Thus as the reed passes inwardly through the distance A, it is substantially free from any magnetic attraction affecting the swing of the pendulum. After the reed leaves the zero position it continues to vibrate sufficiently to eliminate the said attractive effect on the pendulum until the reed reaches the position b. Thus the pendulum and reed have also passed outwardly through a distance B without having the swing of the pendulum substantially affected by the field. It will be noted that the distance B is greater than the distance A by the distance C, and the pendulum is being drawn forwardly during its passage through the distance C. When the pendulum swings from right to left, the same action takes place in reverse order. Thus it will be apparent that, during each stroke, the pendulum is given an impetus forwardly equal to the magnetic attraction of the field on the reed through a distance C.

While in Figs. 1 and 2 I have illustrated the vibratory reed as carried at the lower end of the pendulum and passing over and above the solenoid, I desire it to be understood that such arrangement is not essential and may be modified considerably for various reasons. For example, in Fig. 3 I have illustrated a pendulum 28 mounted to swing about a point 30 and carrying a reed suspended over the solenoid 32. This pendulum may also be provided with one or more arms 34 carrying reeds cooperating with solenoids 35 and 36. It will be apparent that locating the solenoid below the pendulum, as in Fig. 1, has the effect of increasing the weight of the pendulum, due to the magnetic down-pull on the reed, and thereby somewhat affecting the normal periodic motion of the pendulum. In like manner, the locating of the solenoid above the pendulum, as at 35, will have the effect of decreasing the weight of the pendulum, due to the magnetic up-pull on the reed. In some cases it may be desirable to use both such solenoids, one of which neutralizes the gravity effect of the other. In other cases, however, it may be desirable to use one or more solenoids located laterally of the pendulum as at 36 it being apparent that such solenoids do not affect the weight of the pendulum.

While it is believed simpler and preferable to mount the vibratory member on the pendulum, it will be apparent that the motions involved are due to a reaction between the vibratory member and the means producing the magnetic field and that therefore either such means or the vibratory member may be carried by the pendulum. In Fig. 4 I have illustrated a pendulum in which these parts are reversed to those shown in Fig. 1. The pendulum 38 is mounted in like manner as the pendulum 10 and carries a solenoid 40 on its free end, the solenoid serving as a bob for the pendulum. Beneath the core 42 of the solenoid and at the point of rest of the pendulum is mounted a vibratory reed 44. As the solenoid swings past the reed, the reed is vibrated and reacts on the solenoid and the pendulum to start and continue the swinging movement thereof in the same manner as already described in connection with Fig. 1.

In Figs. 5 and 6, I have shown the invention as applied to a pendulum of the torsion type. In this case the pendulum comprises a weight 46 swung from a support 48 by means of a flat reed 50 of magnetic material. A solenoid 52 is mounted adjacent to the reed in such position that its core 54 is near one edge of the reed, the core preferably being placed slightly to one side of the normal position of the reed. When a pulsating current is passed through the solenoid the reed is attracted and is vibrated laterally past the solenoid with the pulsations. As these vibrations increase the weight is given a rotating movement which eventually results in reversibly rotating the weight through its full periodic motion. The action is believed to be substantially the same as that described in connection with Fig. 1 whereby the pendulum is given a slight impulse forward each time it passes the zero position.

The invention, as above specifically described, contemplates the use of swinging or torsion types of pendulums, and it will be apparent that other well known types of oscillating mechanisms may be used in like manner. While either the coil producing the magnetic field or the vibratory element may be carried by the oscillatory member, I find that it is preferable and simpler to attach the vibratory element to the pendulum and allow it periodically to pass through the magnetic field, it being understood, however, that reference to passage of the element through the field, as herein described and claimed, refers to relative movement rather than to specific movement of either the element or the field producing coil. The relation of the parts is such that the vibratory element is normally within the field, although not necessarily disposed centrally therein or midway thereof.

While the invention appears to be particularly applicable to use in connection with pendulums, I desire it to be understood that it is not to be considered as thus limited, and that it is also applicable to other actuated members mounted to oscillate in a similar manner. For example, in Fig. 7, I have illustrated the invention as embodied in a balance wheel of the type commonly employed in clocks and like timing mechanisms. This embodiment comprises a member or wheel 56 mounted to rotate on studs 58 and counterbalanced on opposite sides of its normally disposed position by a spring 60. A vibratory reed 62 of magnetic material is mounted on the wheel to project laterally thereof. The spring normally holds the wheel in the position illustrated and two solenoids 64 are located with their cores 66 adjacent to the ends of the reed. When the solenoids are energized with a pulsating current, the pulsations in the magnetic fields produced cause the reed ends to vibrate. This vibration, reacting laterally of and against the reed and wheel causes the wheel to vibrate rotatably and eventually to oscillate with periodic motion. Thereafter the wheel is kept at such motion by the slight impulses imparted thereto through the reed as the latter passes through the fields, as heretofore described in connection with pendulums.

The form of invention illustrated in Figs. 8–10 is like that shown in Figs. 1 and 2 except that a further feature is added thereto. It may in some cases be desirable to produce rotary motion from the oscillating motion of the pendulum and/or to regulate the uniformity of the pendulum oscillations, the added mechanism illustrated in these figures of the drawings being adapted to serve such functions. The pendulum 70 with its bob 72 is supported by a reed 74 for pivotal movement on and about a post 76, an open frame 78 being provided between the pendulum rod 70 and the reed 74. The pendulum may be oscillated by the coaction of an electro-magnet 80 and a vibratory reed 82 carried by the pendulum, in the manner heretofore described in reference to Figs. 1 and 2.

The post 76 is carried on a back plate 84 which also carries the remaining mechanism now to be described. A shaft 86 rotatably supported in the plate 84 carries a crown wheel 88 located within the open frame 78 and within the plane of oscillation of the pendulum. Also rotatably supported on the plate 84 is a shaft 90 carrying a pallet 92 having two teeth 93 at its ends cooperating with the teeth 95 of the wheel 88 to rotate the wheel in the direction of the arrow upon oscillation of the pallet under the action of a weight 94 on the other end of an upwardly extending rod 96 rigid with the pallet. The weight is located in the upper restricted portion of the frame 78 and its pivotal movement is limited by two pins 98 also carried by the plate 84.

Pivotal movement of the pallet 92 within the limits of the pins 98 acts through the teeth 93 and 95 to rotate the wheel 88 in the direction of the arrow, each tooth 93 engaging the long side of a tooth 95 and rotating the wheel through such engagement until the straight side of the adjacent tooth 95 comes into contact with the tooth 93. In moving from one side to the other through its zone of operation, the rod 96 passes through a neutral position, which position is the vertically extending position of the rod. At each pendulum oscillation the upper restricted portion of the frame 78 contacts the weight 94 and moves it through the said neutral position, the weight thereupon falling ahead of the pendulum movement and functioning through the pallet to rotate the wheel forwardly. Thus a rotary movement is obtained from the oscillating movement of the pendulum. A further and possibly more important result is the regulatory action of this mechanism on the pendulum. The amount of energy required of the pendulum to move the weight is uniform at each oscillation of the pendulum and this action is such as to regulate or control the pendulum oscillations to a precise uniformity and regularity otherwise difficult or impossible to produce. It will also be apparent that the locating of the functioning mechanism within the frame 78 and the plane of oscillation of the pendulum results in keeping the pendulum oscillations true and always within said plane.

Having thus described my invention, what I claim as new and desire to secure by Letters Patent of the United States, is,

1. An electro-magnetic motor, comprising means for producing a magnetic field of varying flux density, vibratory means presenting magnetic material in said field, and an actuated member, one of said means being mounted on and for oscillation with said member and the other means being so located that said magnetic material passes transversely through said field upon said oscillation, said field causing the vibratory means to vibrate at each passage therethrough and to react on said member to oscillate it at a rate less than the rate of vibration of the vibratory means.

2. The motor defined in claim 1 in which said vibratory means is associated with the actuated member in position repeatedly to pass said magnetic material in opposite directions through said field.

3. The motor defined in claim 1 in which said vibratory means is a flexible reed containing magnetic material.

4. The motor defined in claim 1 in which said vibratory means is a flexible reed containing magnetic material, and wherein the reed is so located that a freely flexible end thereof repeatedly passes through the field upon actuation of the said member.

5. An electro-magnetic motor comprising means for producing a pulsating magnetic field, vibratory means presenting magnetic material in said field, and a member supported for movement about its point of support and associated with and in position to impart periodic motion to one of said means relative and adjacent to the other means and repeatedly pass the vibratory means in opposite directions through the field, said field causing the vibratory means to vibrate at each passage through the field and to react on the member to maintain said periodic motion.

6. An electro-magnetic motor comprising means for producing a magnetic field of varying flux density, vibratory means presenting magnetic material in said field and an actuated pendulum associated with and in position to oscillate one of said means therewith adjacent to the other means and repeatedly pass the vibratory means through the field, said field causing the vibratory means to vibrate at each passage through the field and to react on and maintain the pendulum in oscillation.

7. The motor defined in claim 6 in which the pendulum is mounted to oscillate about an axis extending transversely of the longitudinal axis of the pendulum.

8. The motor defined in claim 6 in which the pendulum is mounted to oscillate about an axis extending longitudinally of and through the pendulum.

9. The motor defined in claim 6 in which the rate of the flux density variations of said field is approximately a multiple of the natural rate of oscillation of the pendulum.

10. An electro-magnetic motor, comprising means for producing a pulsating magnetic field, vibratory means including a flat reed of magnetic material normally in said field, and an actuated pendulum associated with and in position to oscillate one of said means with the pendulum relatively and closely adjacent to the other means and pass the reed through the field, said field causing the reed to vibrate at each passage through the field and to react on and maintain the pendulum in oscillation.

11. A self-starting electro-magnetic motor, comprising means for producing a pulsating magnetic field, vibratory means presenting magnetic material in said field, and an actuated pendulum associated with one of said means and so mounted that said magnetic material is in said field when the pendulum is at rest and passes alternately in opposite direction through the field when the pendulum is in motion, said field being adapted to vibrate the vibratory means and by reacting on the pendulum to start and continue the actuation of the pendulum in a predetermined path repeatedly passing the vibratory means through the field.

12. An electro-magnetic motor, comprising means for producing a pulsating magnetic field, a vibratory member presenting magnetic material in said field, and an actuated pendulum associated with and in position to oscillate said member with the pendulum relatively and adjacent to said means and pass the magnetic material through the field, said field causing the vibratory member to vibrate and actuate the pendulum at each passage of the magnetic material through the field.

13. An electro-magnetic motor, comprising means for producing a pulsating magnetic field, a pendulum mounted for oscillation adjacent to said means, and a vibratory reed of magnetic material carried by the pendulum and having a free and unloaded end positioned to pass through and be vibrated by said field upon oscillation of the pendulum.

14. An electro-magnetic motor, comprising a member mounted for oscillation about a fixed axis, means for producing a magnetic field of varying flux density, vibratory means carried by the member and presenting magnetic material in said field and arranged to pass alternately in opposite directions through the field as the member oscillates, and resilient means associated with the member and normally holding the member in a centrally disposed position with the vibratory means in said field, the field causing the vibratory means to vibrate and give an oscillating impulse to the member at each passage thereof through the field and said resilient means acting to regulate such oscillation and return the member to said centrally disposed position.

15. The motor defined in claim 14 in which the vibratory means is a flexible reed containing magnetic material and having a free and unloaded end normally in centrally disposed position in the field.

16. An electro-magnetic motor comprising a member mounted for oscillation about a fixed axis, a reed of magnetic material mounted between its ends on the member and extending transversely thereof at a point remote from said axis, the member normally being located approximately at its midpoint of oscillation, and means for producing pulsating magnetic fields adjacent to the ends of the reed when located at said midpoint of oscillation, said fields causing the reed end to vibrate and oscillate the member.

17. In combination, means for producing a pulsating magnetic field, vibratory means including a flat reed of magnetic material located normally in said field, an actuated pendulum associated with and in position to oscillate one of said means with the pendulum relatively to and in a path closely adjacent to the other means and pass the reed alternately in opposite directions through the field, said field causing the reed to vibrate and to give an oscillating impulse to the pendulum at each passage of the reed through the field, a rotary member supported independently of the pendulum, and means including a crown wheel and double pallet cooperating with the pendulum for causing rotation of the member in one direction and preventing reverse rotation thereof upon actuation of the pendulum.

18. In combination, a pendulum mounted to swing about an axis extending transversely of the longitudinal axis of the pendulum, a rotary toothed wheel supported independently of the pendulum, a pivoted member supported independently of the pendulum, means carried by the pivoted member for cooperating with the teeth of said wheel to rotate the wheel upon pivotal movement of the pivoted member, a weight carried by the pivoted member, and means limiting the pivotal movement of the pivoted member through a zone wherein the weight passes through a neutral position, the pendulum being arranged to carry the weight in opposite directions through said neutral position upon movement of the pendulum in opposite directions respectively.

ROBERT K. PRINCE.